United States Patent Office 3,839,352
Patented Oct. 1, 1974

3,839,352
PREPARATION OF COUMARIN-V-TRIAZOLE OXIDES AND PROCESS FOR PRODUCING COUMARIN-V-TRIAZOLES THEREFROM
Rudolf Kirchmayr, Binningen, Hansjorg Heller, Riehen, and Jean Rody, Basel, Switzerland, assignors to Ciba-Geigy AG, Basel, Switzerland
No Drawing. Original application Feb. 12, 1968, Ser. No. 704,587. Divided and this application Feb. 18, 1971, Ser. No. 116,620
Claims priority, application Switzerland, Feb. 16, 1967, 2,319/67
Int. Cl. C07d 99/04
U.S. Cl. 260—308 A  2 Claims

ABSTRACT OF THE DISCLOSURE

2 - [3 - phenyl-coumarinyl-(7)]-v-triazole-1-(or -3-) oxides which are unsubstituted in 4- and 5- position at the triazole moiety, or have in one or both of the latter two positions non-chromogenic substituents, are described as fluorescers which are useful for the marking, invisible in daylight but fluorescent in ultraviolet light, of objects, such as pieces of laundry. Their production, especially by oxidizing coumarin-(7)-hydrazone-oximes is described.

Furthermore, the conversion of 2-coumarin-substituted v-triazole-1-(or -3-) oxides, by reducing, e.g. with hydrogen in statu nascendi, to the corresponding triazoles is also disclosed.

CROSS REFERENCE TO RELATED APPLICATIONS

This application is a division of application Ser. No. 704,587, filed Feb. 12, 1968.

DETAILED DISCLOSURE

The present invention concerns new coumarins substituted in the 3-position which contain a v-triazole-(2)-oxide radical in the 7-position, processes for the production thereof and their use as fluorescers and intermediate products for optical brighteners. The invention further relates to the production of valuable 7-v-triazolyl-(2) coumarin brighteners from the aforesaid new v-triazole-oxides.

The new coumarinyl-v-triazole oxides of the formula I

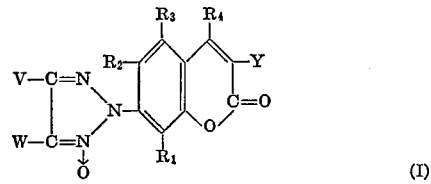

(I)

wherein

V and W independently of each other represent hydrogen, or an optionally non-chromogenically substituted alkyl, alkenyl, aralkyl, cycloalkyl group, or a carbocyclic or heterocyclic aryl group consisting of, at most 3 rings having 5 or 6 members, or a saturated heterocycle, or the sulphonic acid group or derivatives thereof, or V and W together represent a tetramethylene group optionally substituted by lower alkyl groups, or an o,ω-phenylmethylene or o,ω-phenylethylene group optionally containing lower alkyl groups, the benzene ring of which may also be non-chromogenically substituted, Y represents a mononuclear carbocylic or heterocyclic aryl group conjugated with the coumarin ring, $R_1$ and $R_4$ independently of each other represent hydrogen or a lower alkyl group and $R_2$ and $R_3$ independently of each other represent hydrogen, a lower alkyl or lower alkoxy group, are of particular interest for providing textiles with a normally invisible distinguishing mark and as intermediate products.

Some methods for the production of v-triazole oxides are known from the literature. They are described, e.g. in Chem. Rev. 46, 51–54 (1950) and in J. Org. Chem. 25, 313 (1960).

Surprisingly, it has been found that particularly good yields of very pure coumarinyl-v-triazole oxides of formula I according to the invention are obtained when oxime hydrazones of the formulae IIa and IIb.

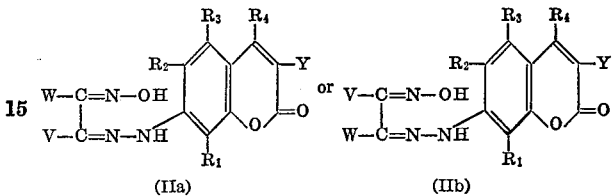

(IIa)         (IIb)

are oxidised to form triazole oxides of formula I, the symbols in formulae IIa and IIb having the meanings given in formula I.

The starting materials are obtained from α-diketones of formula III

(III)

by reacting these, in any order desired with hydroxylamine and with a 7-hydrazino-3-aryl-coumarin of the general formula IV

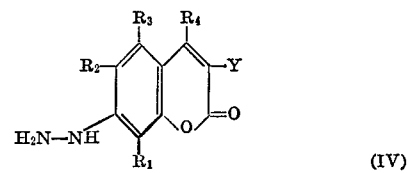

(IV)

wherein $R_1$, $R_2$, $R_3$, $R_4$ and Y have the meanings given in formula I.

Preferably, the substituents $R_1$ and $R_4$ in formula I represent hydrogen and the substituents $R_2$ and $R_3$ in formula I preferably represent hydrogen, methyl or methoxy.

V and W in formula I, as non-chromogenic, monovalent substituents, can represent, e.g.: a sulphonic acid group; an alkyl, alkenyl, aralkyl, cycloalkyl group or a carbocyclic or heterocyclic aryl group optionally substituted as defined which consists of at most three rings having 5 or 6 members; a saturated heterocycle, a secondary or tertiary acylamide group optionally substituted as defined, containing an aliphatic, carbocyclic or heterocyclic acyl radical, an alkoxy carbonyl or carbamoyl radical; a secondary or tertiary di- or tri- azinylamino group substituted as defined. When V and W together form a hydroaromatic ring condensed with the two carbon atoms of the v-triazole ring, then they represent, in particular, a tetramethylene group optionally substituted by low alkyl groups, e.g. the tetramethylene group, 1-methyl - tetramethylene group or the 1,3-dimethyl-tetramethylene group, or they represent an o,ω-phenylmethylene or o,ω-phenylethylene group optionally having lower alkyl groups, the benzene ring of which can be substituted as defined by, e.g. a sulphonic acid group, halogen, lower alkyl or lower alkoxy groups.

In particularly preferred compounds, one of the two radicals V and W represents hydrogen or a low molecular alkyl group whilst the other radical represents a low molecular alkyl group, a phenyl group unsubstituted or substituted by methyl, halogen up to the atomic number 35 or low molecular alkoxy groups, a furyl-(2) group or a thienyl-(2) group, and $R_1$, $R_2$, $R_3$, $R_4$ represent hydrogen and Y represents a phenyl, methylphenyl or a chlorophenyl radical.

The mononuclear carbocyclic or heterocyclic aryl group Y is preferably an unsubstituted or non-chromogenically substituted phenyl radical. Like V and W when representing phenyl, it can contain, for example, the following non-chromogenic substituents: alkyl groups such as methyl, ethyl, propyl, isopropyl, n-butyl groups; halogens such as fluorine, particularly however, chlorine, or also bromine; alkoxy groups such as methoxy, ethoxy, propoxy, butoxy groups; alkylene or alkylene ether groups bound at positions adjacent to the benzene ring such as tetramethylene or methylenedioxy groups.

As providing particular properties to the coumarinyl-v-triazole oxides according to the invention, the following are worthy of mention:

(a) basic substituents, e.g. of aromatic rings or of functional groups, e.g. in carboxylic acid ester, carboxylic acid amide or sulphonic acid amide groups, such as dialkylamino, piperidino, morpholino, N-alkyl-piperazino groups, which substituents can be bound to carbocycles direct or, like the functional derivatives of acid groups mentioned, by way of alkylene radicals, cyclammonium groups such as the pyridinium acetyl group which can be bound to organic radicals direct or by way of imino groups or oxygen, because they lend to the new fluorescers affinity to fibres made of acid modified polymers;

(b) acid substituents, e.g. carboxyl, sulphonic acid and optionally alkylated, arylated or acylated sulphonic acid amide groups, because they lend to the new fluorescers affinity to natural and synthetic polyamide fibres;

(c) hydroxyalkyl, cyanoalkyl and alkanoyloxyalkyl groups particularly as nitrogen substituents of amino or amide compounds because, in suitable linkage, they lend the coumarin compounds according to the invention affinity to high molecular polyester fibres.

Examples of suitable α-dicarbonyl compounds of formula III for the production of hydrazone oximes are: glyoxal, diacetyl (2,3-dioxobutane), 1,2-dicyclohexyl-1,2-dioxoethane, benzyl, 4,4'-dichlorobenzyl, 4-chloro-2-'-methoxy-benzyl, 4-nitro-4'-methoxy-benzyl, 1,6-diphenyl-3,4-dioxohexane, 2,2'-furyl or 2,2'-pyridyl.

The monoximes or monohydrazones occurring as intermediates can be produced by methods known per se also from suitable methylene ketones V-CH₂—CO-W and V-CO—CH₃-W, by introducing thereinto a nitroso group or by reaction with a diazonium compound corresponding as precursor to the hydrazino coumarin IV.

Methylene ketones into which a nitroso group can be introduced are, e.g.: methylethyl ketone, methylhexyl ketone, diethyl ketone, dipropyl ketone, cyclohexanone, α-tetralone, propiophenone, laurophenone, dibenzyl ketone or di-β-phenylethyl ketone (1,5-diphenyl-3-oxopentane).

Methylene ketones which can be coupled directly are: benzylmethyl ketone, 1-phenyl-butanone-(2), benzylcyclopentyl ketone, benzylcyclohexyl ketone, dibenzyl ketone, benzyl-p-chlorobenzyl ketone, benzyl-2,4-dimethylbenzyl ketone, benzyl-p-methoxybenzyl ketone, benzyl-pyridyl-(3)-ketone, benzylfuryl-(2)-ketone or benzylthienyl-(2)-ketone (accessible from the sodium salt of benzyl cyanide by reaction with the corresponding acid chloride, saponification of the cyano group and decarboxylation); also 1,2,3,4-tetrahydro-2-oxo-naphthalene, also desoxybenzoins such as desoxybenzoin (benzylphenyl ketone), benzyl-p-ethoxyphenyl ketone, benzyl-2,4- and benzyl-3,4-dimethylphenyl ketone, benzyl-2,5-dichlorophenyl ketone (all obtainable from phenylacetic acid chloride and the corresponding benzene derivatives according to Friedel-Crafts), p-chlorobenzylphenyl ketone, p-methoxybenzyl-p-butoxyphenyl ketone, p-methoxybenzyl-2,4-diethylphenyl ketone or p-nitrobenzylphenyl ketone (obtainable from correspondingly substituted phenylacetic acid chlorides and benzenes) as well as heterocyclic methylene ketones such as desoxyfuroin (furyl-(2)-furyl-(2)-methyl ketone).

When the methylene group in the methylene ketones V-CH₂—CO-W or V-CO—CH₂-W is not sufficiently capable of being coupled, the corresponding methine compounds can be used by methods known per se. These methine compounds contain an acyl or carboxy group instead of one of the hydrogen atoms of the methylene group which is displaced, with formation of the monohydrazone, on reaction with the diazonium compound.

Examples of such coupling components are:

3-methyl-2,4-pentadione,
acetoacetic acid,
2-methyl-3-ketobutyric acid,
2-oxo-3-carboxyundecane,
1-chloro-5-carboxy-6-oxoheptane,
1-methoxy-5-carboxy-6-oxoheptane,
6-carboxy-7-oxocaprylic acid nitrile,
1-bromo-9-carboxy-10-oxoundecane,
10-carboxy-11-oxolauric acid ethyl ester,
α-benzylacetoacetic acid,
α-(2-phenylethyl)-acetoacetic acid,
α-(p-chlorobenzyl)-acetoacetic acid,
α-(m-methoxybenzyl)-acetoacetic acid,
α-(2,4-dimethylbenzyl)-acetoacetic acid,
α-(cyclohexyl)-acetoacetic acid,
α-cyclopentyl-acetoacetic acid,
2-methyl-3-ketovaleric acid,
cyclohexanone-2-carboxylic acid.

In the production of the monohydrazones by coupling, the diazonium compounds used correspond to the general formula V

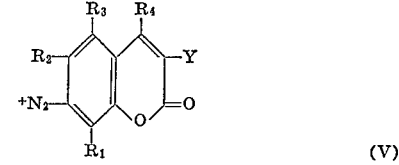

(V)

wherein the symbols R₁, R₂, R₃, R₄ and Y have the meanings given in formula I. The diazonium salts are produced in the usual way by diazotisation of the corresponding amino coumarins.

Suitable diazo components are, e.g.:

3-phenyl-7-amino-coumarin,
3-phenyl-6-methyl-7-amino-coumarin,
3-(3-methylphenyl)-7-amino-coumarin,
3-(4-methylphenyl)-7-amino-coumarin,
2-(3-dimethylphenyl)-7-amino-coumarin,
3-(3-chlorophenyl)-7-amino-coumarin,
3-(4-chlorophenyl)-7-amino-coumarin,
3-(2,4-dichlorophenyl)-7-amino-coumarin,
3-(3,4-dichlorophenyl)-7-amino-coumarin,
3-(4-fluorophenyl)-7-amino-coumarin,
3-sulphophenyl-7-amino-coumarin,
3-thienyl-(2)-7-amino-coumarin,
3-carboxy-7-amino-coumarin,
3-(m-cyanophenyl)-7-amino-coumarin,
3-(m-carboxyphenyl)-7-amino-coumarin,
3-(m-methoxyphenyl)-7-amino-coumarin.

Such amino coumarins can be produced, e.g. according to the processes described in Belgian Patent No. 542,754 or Dutch application open for public inspection 6,511,305.

The coumarinyl-v-triazole oxides of formula I are produced from the corresponding hydrazone oximes already described by oxidative ring closure effected by the most various oxidising agents. It is recommended that cyclisation be performed in solvents which are stable to oxidation. In acid, e.g. acetic acid, solution, bichromate or hydrogen peroxide can be used as oxidising agents; in basic solvents such as pyridine or mixtures of pyridine and water, e.g. potassium ferricyanide can be used. The generally useful and, therefore, preferred process consists in oxidising with copper-(II) sulphate in pyridine/water. It is not necessary to use stoichiometric amounts of copper because the monovalent copper formed in the reaction can be continuously reconverted into the divalent state during the reaction by bubbling in air or oxygen.

An analogous process for the production of nitro-triazole oxide-substituted coumarin compounds consists in coupling a diazonium compound of formula V with a methylene ketoxime of formula VI to form an $\alpha,\beta$-monoxime coumaryl hydrazone of formula VII

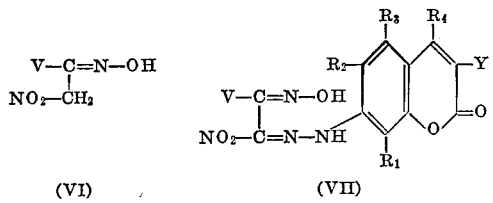

and converting this compound by oxidation into the corresponding triazole oxide coumarin compounds. The symbols in these formulae have the meanings given in formula I.

Coumarinyl-v-triazole oxides obtained according to the invention can contain a sulphonic acid group, a sulphamide group or a sulphamide group substituted at the nitrogen at the 3-phenyl radical. These groups can already be present in the starting materials such as in the 3-(3'- or 4'- sulpho- or sulphamoyl- phenyl)-7-amino-coumarins. However, the sulphonic acid group can also be introduced in a simple way by sulphonation after the production according to the invention of the coumarinyl-v-triazole oxides and it can be modified into sulphonic acid amide groups by way of the acid chloride. The sulphochlorination can also be performed with chlorosulphonic acid.

The coumarinyl-v-triazole oxides of formula I are of practical use for providing yarns or articles made of natural or synthetic materials such as cotton, cellulose ester, polyester or polyamide which can be washed with a normally invisible distinguishing mark, i.e. it is invisible in daylight or artificial light but has a clear fluorescence in UV light.

For this purpose, the new coumarinyl-v-triazole oxides are dissolved in amounts of 0.05–0.5% by weight in organic solvents such as acetophenone, p-methylacetophenone, p-chloroacetophenone, tetrahydronaphthalene (Tetralin), xylene, o-dichlorobenzene or 1,2,4-trichlorobenzene, particularly advantageously however, in cyclohexanone, and applied to the material with a felt marking pen. Textile material which has either not been treated or has already been treated with any optical brightener desired can be treated and marked according to the invention. The marking so made is clearly visible in UV light.

The coumarinyl-v-triazole oxides according to the invention are also of great importance as intermediate products in the production of 7-v-triazoyl-(2)-coumarin compounds which are used as optical brighteners for polyester, polyvinyl chloride, cellulose ester and nitrocellulose materials. It is true that it is possible to produce such 7-v-triazolyl-(2)-coumarin compounds in other ways but these compounds can be produced in a particularly pure state and in high yield from the corresponding coumarinyl triazole oxides according to the invention by reduction.

"Lower" used in connection with an aliphatic radical means that the latter has at most 4 carbon atoms.

The following examples further illustrate the invention. The temperatures are in degrees Centigrade. Percentages are given by weight unless expressly stated otherwise.

EXAMPLE 1

2-[3-phenylcoumarinyl-(7)]-4,5-diphenyl-v-triazole-1-oxide 22.5 g. of benzil-α-monoxime and 50 ml. of a mixture of equal volumes of glacial acetic acid and water are added to a solution of 25.2 g. of 3-phenyl-7-hydrazino-coumarin in 100 ml. of ethylene glycol monomethyl ether and the whole is stirred for 6 hours at 70°–80°. The reaction mixture is cooled and benzil-[3-phenyl-coumarinyl-(7)]-hydrazono-oxime crystallises in orange-yellow needles which melt at 224–230° with decomposition.

A solution of 10.0 g. of copper sulphate pentahydrate in 30 ml. of water is added dropwise within 1 hour to a refluxing solution of 9.2 g. of benzil-[3-phenyl-coumarinyl-(7)]-hydrazonooxime in 200 ml. of pyridine. The reaction mixture is refluxed for another hour, cooled and the crystal mass which separates is filtered off. The crystalline precipitate is washed with hot water and methanol in small portions and recrystallised from toluene. The 2-[3-phenyl-coumarinyl-(7)] - 4,5 - diphenyl-v-triazole - 1-oxide obtained melts at 214°.

If instead of 3-phenyl-7-hydrazino-coumarin, 3-phenyl-4-methyl-7-hydrazino-coumarin is condensed analogously with benzil monoxime and the oxime hydrazone is oxidised with copper sulphate, then 2-[3-phenyl-4-methyl-coumarinyl-(7)] - 4,5-diphenyl-v-triazole - 1-oxide, M.P. 218–219°, is obtained.

EXAMPLE 2

2-[3-phenyl-coumarinyl-(7)]-4,5-dimethyl-v-triazole-1-oxide

A solution of 30.0 g. of copper sulphate pentahydrate in 50 ml. of water is added dropwise within 1 hour to a refluxing solution of 33.5 g. of diacetyl-[3-phenyl-coumarinyl-(7)]-hydrazone oxime in 150 ml. of pyridine, and the reaction mixture is then refluxed for 2 hours, cooled and the crystal mass which precipitates is filtered off. The 2-[3-phenyl-coumarinyl - (7)] - 4,5-dimethyl-v-triazole-1-oxide so obtained melts at 229°.

The diacetyl - [3-phenyl-coumarinyl-(7)] - hydrazone oxime used as starting product for the production of this triazole oxide is obtained analogously to Example 1 from diacetyl monoxime and 3-phenyl-7-hydrazino-coumarin.

The following compounds are obtained by the same procedure: 2 - [3-phenyl-coumarinyl-(7)] - 4 - ethyl-5-methyl-v-triazole-3-oxide, M.P. 162, starting from pentane - 2,3-dione monoxime, and 2-[3-phenyl-coumarinyl-(7)] - 4 - pentyl-5-methyl-v-triazole-3-oxide, M.P. 123–124°, starting from octane - 2,3-dione monoxime.

EXAMPLE 3

2-[3-phenyl-coumarinyl-(7)]-4-methyl-5-furyl-(2)-v-triazole-3-oxide 30 ml. of a mixture of equal volumes of glacial acetic acid and water are added to a solution of 15.3 g. of isonitroso-2-propiofurane and 25.2 g. of 3-phenyl-7-hydrazino-coumarin in 150 ml. of ethylene glycol monomethyl ether. The whole is heated to 70–80° and stirred at this temperature for 5 hours. 1-Furyl-(2)-1-[3-phenyl-coumarinyl-(7)-hydrazono]-propane - 2 - one oxime crystallises out of the reaction mixture. It melts at 255–260° with decomposition.

A solution of 17.5 g. of copper sulphate-pentahydrate in 30 ml. of water is added dropwise at 80–90° to a solution of 12.5 g. of 1-furyl-(2)-1-[3-phenyl-coumarinyl-(7)-hydrazono]-propane-2-oxime in 80 ml. of pyridine. The reaction mixture is then refluxed for 1 hour, cooled and the precipitated crystal mass is filtered off. The residue is washed with methanol and water and recrystallised from chlorobenzene. The 2-[3-phenyl-coumarinyl-(7)]-4-methyl-5-furyl-(2)-v-triazole-3-oxide so obtained melts at 256–258°.

2 - [3 - Phenyl - coumarinyl - (7)] - 4 - methyl - 5 - p-methylphenyl-v-triazole-3-oxide, M.P. 209°, is obtained analogously from p-methyl-β-isonitrosopropiophenone.

EXAMPLE 4

2-[3-phenyl-coumarinyl-(7)]-4-methyl-5-phenyl-v-triazole-3-oxide 24.2 g. of 3-phenyl-7-amino-coumarin in 50 ml. of water and 100 ml. of concentrated hydrochloric acid are diazotised by the addition of a solution of 6.9 g. of sodium nitrite in 20 ml. of water. The suspension of the diazonium salt obtained is added dropwise within 3 hours at 0–5° to a mixture of 15.0 g. of benzylmethyl ketone, 200 ml. of isopropanol and 50 ml. of pyridine. The reaction mixture is stirred for 12 hours at 5–10°, then brought to room temperatures slowly and stirred for another 24 hours at this temperature. It is then filtered and the residue is washed with 1% hydrochloric acid and with methanol. After one recrystallisation from ethyl Cellosolve, the methylphenyl glyoxal-[3-phenyl-coumarinyl-(7)]-hydrazone so obtained melts at 215–216°.

The solutions of 6.9 g. of hydroxylamine hydrochloride in 20 ml. of water and of 13.6 g. of sodium acetate in 30 ml. of water are added simultaneously to a 70° hot solution of 19.1 g. of methylphenyl-glyoxal-[3-phenyl-coumarinyl-(7)]-hydrazone in 400 ml. of dioxane. The reaction mixture is then refluxed for 2 hours. Yellow-brown crystals begin to separate out which, on completion of the reaction, are filtered off under suction and washed with methanol. In this way, methylphenyl-glyoxal-oxime-[3-phenyl-coumarinyl-(7)]-hydrazone is obtained as a yellow powder which melts at 265–270° with decomposition.

19.8 g. of the oxime hydrazone obtained in this way are dissolved at 100–110° in 250 ml. of pyridine. A solution of 30.5 g. of copper sulphate in 50 ml. of water is added dropwise to this solution within 3 hours. Towards the end of the dropwise addition, the reaction product begins to crystallise out. The crystalline precipitate is filtered off under suction and washed with methanol and water. The 2 - [3 - phenyl - coumarinyl - (7)] - 4 - methyl - 5 - phenyl-v-triazole-3-oxide so obtained melts at 232°.

EXAMPLE 5

2-[3-phenyl-coumarinyl-(7)]-4-methyl-5-p-chlorophenyl-v-triazole-1-oxide 43.2 g. of 1-(p-chlorophenyl)-1-oximino-propane-1,2-dione-[3-phenyl-coumarinyl-(7)]-hydrazone in 400 ml. of pyridine are heated to 90–100°. At this temperature, a solution of 50.0 g. of copper sulphate-pentahydrate in 100 ml. of water is added dropwise within 1 hour and the reaction mixture is then stirred for 5 hours at 90–100°. On cooling the reaction mixture, crystals are obtained which are filtered off under suction and washed with methanol. The 2 - [3 - phenyl-coumarinyl-(7)]-4-methyl-5-p-chlorophenyl-v-triazole-1-oxide so obtained melts at 228°.

The oxime hydrazone used as starting product is obtained as follows:

130.0 g. of acetoacetic ester are saponified at room temperature with 10% sodium hydroxide solution. A solution of 70.0 g. of sodium nitrite in 300 ml. of water is added, the reaction mixture is cooled to 0–5° and, at this temperature, 275 g. of 28% sulphuric acid are added dropwise within 1 hour. The whole is then stirred for 1 hour whereupon solutions of 25.0 g. of copper sulphate in 250 ml. of water and of 50 g. of sodium sulphite in 250 ml. of water are added. A diazonium salt solution produced in the usual way from 127.6 g. of p-chloraniline is added to this reaction mixture at 0–10°. 1-(p-chlorophenyl)-1-oximino-propane-1,2-dione precipitates in crystalline form. After one recrystallisation from methanol, this compound melts at 181–182°.

This oxime is condensed as described in Example 1 with 3-phenyl-7-hydrazino-coumarin to form 1-(p-chlorophenyl) - 1 - oximino - propane - 1,2 - dione - [3 - phenyl - coumarinyl-(7)]-hydrazone.

If instead of p-chloraniline, the arylamines given in Table A are used with the procedure described above, then v-triazole oxides listed in Table B are obtained.

TABLE A aniline,
p-toluidine,
p-nitroaniline,
p-aminobenzoic acid,
3,4-dichloraniline,
4-methoxy aniline,
4-diethylamidosulphoaniline,
3-trifluoromethyl aniline.

TABLE B

2-[3-phenyl-coumarinyl-(7)]-4-methyl-5-phenyl-v-triazole-1-oxide, M.P. 186–187°, 2-[3-phenyl-coumarinyl-(7)]-4-methyl-5-p-methylphenyl-v-triazole-1-oxide, M.P. 197°, 2-[3-phenyl-coumarinyl-(7)]-4-methyl-5-p-nitrophenyl-v-triazole-1-oxide, M.P. 252°, 2-[3-phenyl-coumarinyl-(7)]-4-methyl-5-p-carboxyphenyl-v-triazole-1-oxide, M.P. 257°, 2-[3-phenyl-coumarinyl-(7)]-4-methyl-5-(3,4-dichlorophenyl)-v-triazole-1-oxide, M.P. 231, 2-[3-phenyl-coumarinyl-(7)]-4-methyl-5-p-methoxyphenyl-v-triazole-1-oxide, M.P. 212°, 2-[3-phenyl-coumarinyl-(7)]-4-methyl-5-p-N,N-diethylsulphamoylphenyl-v-triazole-1-oxide, M.P. 225°, 2-[3-phenyl-coumarinyl-(7)]-4-methyl-5-(3-trifluoromethylphenyl)-v-triazole-1-oxide, M.P. 198°.

EXAMPLE 6

2-[3-phenyl-coumarinyl-(7)]-4-methyl-5-benzyl-v-triazole-1-oxide 15 g. of 3-phenyl-7-hydrazino-coumarin and 9 g. of 4-phenyl-3-isonitrosobutan-2-one [1] in 80 ml. of ethylene glycol monomethyl ether are refluxed for 4 hours. A partial solution is obtained. On adding another 70 ml. of ethylene glycol monomethyl ether and 130 ml. of ethanol, the precipitated product is almost completely dissolved at boiling temperature. This solution is clarified and allowed to cool. The yellow-brown crystals obtained are filtered off, washed with alcohol and dried. In this way, 13 g. of the hydrazone oxime of the formula

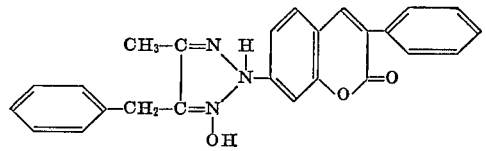

are obtained. It melts at 209°.

7.8 g. of the hydrazone oxime mentioned above are dissolved in 70 ml. of pyridine at 40° and, while stirring, a solution of 10 g. of copper sulphate pentahydrate in 20 ml. of water is added within 1 hour at this temperature. The reaction mixture is stirred for another 2½ hours at 40–50°, the dark precipitate is filtered off and well washed with water. The triazole-N-oxide is obtained as a yellow powder. It melts at 182–183°.

By repeating Example 6, but using in lieu of 9 g. of 4-phenyl-3-isonitrosobutan-2-one, equivalent amounts of the correspondingly substituted phenyl - isonitrosobutanones, there are obtained (the isonitrosobutanones are produced from analogous starting materials by the method described in Gazz. chim. ital., supra):

(a) 2-[3-phenyl-coumarinyl-(7)]-4-methyl-5-(4'-methyl-benzyl)-v-triazole-1-oxide, (b) 2-[3-phenyl-coumarinyl-(7)]-4-methyl-5-(3'-ethyl-benzyl)-v-triazole-1-oxide, (c) 2-[3-phenyl-coumarinyl-(7)]-4-methyl-5-(2',4',6'-trimethyl-benzyl)-v-triazole-1-oxide, (d) 2-[3-phenyl-coumarinyl-(7)]-4-methyl-5-(4'-ethoxy-benzyl)-v-triazole-1-oxide,

---

[1] Produced as described in Gazz. chim. ital., 35, 394 (1905).

(e) 2-[3-phenyl-coumarinyl-(7)]-4-methyl-5-(2'-phenyl-ethyl)-v-triazole-1-oxide,
(f) 2-[3-phenyl-coumarinyl-(7)]-4-methyl-5-(4'-chloro-benzyl)-v-triazole-1-oxide,
(g) 2-[3-phenyl-coumarinyl-(7)]-4-methyl-5-(3',4'-dichloro-benzyl)-v-triazole-1-oxide,
(h) 2-[3-phenyl-coumarinyl-(7)]-4-methyl-5-(4'-bromo-benzyl)-v-triazole-1-oxide,
(i) 2-[3-phenyl-coumarinyl-(7)]-4-methyl-5-(4'-fluoro-benzyl)-v-triazole-1-oxide,
(j) 2-[3-phenyl-coumarinyl-(7)]-4-methyl-5-(3'-methyl-4'-chloro-benzyl)-v-triazole-1-oxide,
(k) 2-[3-phenyl-coumarinyl-(7)]-4-methyl-5-[2'-(4''-chloro-phenyl)-ethyl]-v-triazole-1-oxide.

EXAMPLE 7

2-[3-phenyl-coumarinyl-(7)]-4-methyl-v-triazole-3-oxide 32.5 g. of acetoacetic acid ethyl ester are dissolved in a solution of 15.0 g. of potassium hydroxide in 600 ml. of water and the solution is stirred for 24 hours at room temperature. This solution of the potassium salt of acetoacetic acid is cooled to 0°, acidified with 2N hydrochloric acid and then a diazonium salt solution prepared in the usual way from 59.25 g. of 3-phenyl-7-amino-coumarin is added at all once. The reaction begins by adding 100 g. of sodium acetate in portions to the reaction mixture; there is strong $CO_2$ development. The reaction mixture is stirred for 5 hours at 0–5°, then for 4 hours at room temperature. The yellow-brown crystalline mass formed is filtered off under suction, washed with water and methanol and in this way 1-[3-phenyl-coumarinyl-(7)-hydrazono]-propan-2-one is obtained which melts at 236–240° with decomposition.

A solution of 37.3 g. of 1-[3-phenyl-coumarinyl-(7)-hydrazono]-propan-2-one in 500 ml. of dioxane is refluxed with 20–75 g. of hydroxylamine hydrochloride and 40.8 g. of sodium acetate for 2 hours. On cooling the reaction mixture, a crystalline precipitate is obtained which is removed, washed with methanol and dried. The 1-[3-phenyl - coumarinyl-(7)-hydrazono]-propan-2-one oxime so obtained melts at over 270° with decomposition.

50.0 g. of copper sulphate pentahydrate in 100 ml. of water are added to a solution of 32.1 g. of the compound obtained above in 300 ml. of pyridine, the addition being made at the boil. The reaction mixture is refluxed for 2 hours, cooled and the crystalline precipitate formed is removed. The 2-[3-penyl-coumarinyl-(7)]-4-methyl-v-triazole-3-oxide obtained melts at 248–250°.

If in the above example, the 3-phenyl-7-amino-coumarin is replaced by 3-(4-methylphenyl)-7-amino-coumarin or 3-(3-chlorophenyl)-7-amino-coumarin or by 3-(3-methoxyphenyl)-7-amino-coumarin then, under analogous conditions, 2-[3-(4-methylphenyl)-coumarinyl-(7)]-4-methyl-v-triazole-3-oxide,
2-[3-(3-chlorophenyl)coumarinyl-(7)]-mehtyl-v-triazole-3-oxide, or
2-[3-(3-methoxyphenyl)coumarinyl-(7)]-4-methyl-v-triazole-3-oxide respectively are obtained.

EXAMPLE 8

2-[3-phenyl-coumarinyl-(7)]-4-mehtylsulphonyl-5-phenyl-v-triazole-1-oxide (a) A solution of 142 g. of copper sulphate pentahydrate in 500 ml. of water is added dropwise within 1 hour to a 90–100° hot solution of 120 g. of phenyl-methylsulphonyl glyoxaloxime-[3-phenyl-coumarinyl - (7)]-hydrazone in 700 ml. of pyridine and the whole is then stirred for two hours at 90°. On cooling the reaction mixture, red-brown crystals are precipitated with 400 ml. of water. These are filtered off under suction and purified by boiling with methyl Cellosolve. In this way, 2-[3-phenyl-coumarinyl-(7)]-4-methylsulphonyl - 5 - phenyl-v-triazole-1-oxide, M.P. 254°, is obtained.

Phenyl-methylsulphonyl glyoxaloxime-[3-phenyl - coumarinyl-(7)]-hydrazone is obtained by coupling diazotised 3-phenyl-7-amino-coumarin on methylsulfonylacetophenone and subsequent oximation with hydroxylamine, in the manner described in Example 3, supra.

(b) 2-[3-phenyl-coumarinyl-(7)]-4-phenylsulphonyl-5-phenyl-v-triazole-1-oxide, M.P. 196°;
(c) 2-[3-phenyl-coumarinyl-(7)]-4-methyl-5-phenylsulphonyl-v-triazole-3-oxide, M.P. 283°;
(d) 2-[3-phenyl-coumarinyl-(7)]-4-methyl-5(4'-methyl-phenylsulphonyl)-v-triazole-3-oxide;
(e) 2-[3-phenyl-coumarinyl-(7)]-5-(3'-ethyl-phenylsulphonyl)-v-triazole-3-oxide;
(f) 2-[3-phenyl-coumarinyl-(7)]-5-(2',4',6'-trimethylphenylsulphonyl)-v-triazole-3-oxide;
(g) 2-[3-phenyl-coumarinyl-(7)]-5-(4'-methoxy-phenylsulphonyl)-v-triazole-3-oxide;
(h) 2-[3-phenyl-coumarinyl-(7)]-5-(4'-chloro-phenylsulphonyl)-v-triazole-3-oxide;
(i) 2-[3-phenyl-coumarinyl-(7)]-5-(3',4'-dichlorophenylsulphonyl)-v-triazole-3-oxide;
(j) 2-[3-phenyl-coumarinyl-(7)]-5-(4'-bromo-phenylsulphonyl)-v-triazole-3-oxide;
(k) 2-[3-phenyl-coumarinyl-(7)]-5-(4'-fluoro-phenylsulphonyl)-v-triazole-3-oxide, are obtained analogously by repeating Example 8, but using correspondingly substituted methyl-phenylsulphonyl glyoxyloximines as starting compounds.

EXAMPLE 9

2-[3-phenyl-coumarinyl-(7)]-4,5-dihydronaphtho[1,2-d]-v-triazole-1-oxide 40.9 g. of Tetralin - 1,2 - dione-[3-phenyl-coumarinyl-(7)-hydrazone]-oxime are dissolved in 400 ml. of refluxing pyridine. A solution of 35.0 g. of copper sulphate pentahydrate in 100 ml. of water is added dropwise to this solution within 2 hours, the reaction mixture being kept under reflux. After two further hours, the dark reaction solution is allowed to cool whereupon the reaction product quickly begins to crystallise out. The suspension is stirred for some hours at room temperature, then filtered under suction and the residue is washed with methanol. The 2-[3-phenyl-coumarinyl-(7)]-4,5-dihydronaphtho[1,2-d]-v-triazole-1-oxide so obtained melts at 240–245°.

The Tetralin - 1,2 - dione-[3-phenyl-coumarinyl-(7)-hydrazone]-oxime used as starting material is produced as follows:

A solution of 50.4 g. of 3-phenyl-7-hydrazino-coumarin in 150 ml. of methyl Cellosolve is added to a solution of 35.0 g. of β-isonitroso-α-tetralone in 100 ml. of methyl Cellosolve. This reaction mixture is acidified with 100 ml. of a mixture of equal parts of glacial acetic acid and water and then stirred for 12 hours at 80°. Tetralin-1,2 - dione - [3-phenyl-coumarinyl-(7)-hydrazone]-oxime precipitates as dark brown crystals.

If instead of the 3-phenyl-7-hydrazino-coumarin, an equivalent amount of 3-(4-methylphenyl)-7-hydrazino-coumarin is used with otherwise the procedure described above, then 2-[3-(4-methylphenyl)-coumarinyl-(7)]-4,5-dihydronaphtho[1,2-d]-v-triazole-1-oxide is obtained.

2-[3-(4-methoxyphenyl)-coumarinyl-(7)]-4,5-dihydronaphtho[1,2-d]-v-triazole-1-oxide, and
2-[3-(4-chlorophenyl)-coumarinyl-(7)]-4,5-dihydronaphtho[1,2-d]-v-triazole-1-oxide are obtained analogously from 3-(4-methoxyphenyl)-7-hydrazino-coumarin and 3-(4-chlorophenyl)-7-hydrazino-coumarin respectively.

EXAMPLE 10

1.5 g. of 2-[3-phenyl-coumarinyl-(7)] - 4 - methyl-5-phenyl-v-triazole-3-oxide are dissolved in 1000 g. of cyclohexanone. Pieces of cotton marked with this solution have a marking which is invisible in daylight but which clearly fluoresces in UV light.

The triazole oxides mentioned in Examples 1–3 and 5–9 also produce equally successful makings on goods to be washed.

EXAMPLE 11

A valuable optical brightener for polyamide and polyester melts for spinning is obtained from the triazole oxide described in Example 1 as follows:

4.6 g. of 2-[3-phenyl-coumarinyl-(7)]-4,5-diphenyl-v-triazole-1-oxide are refluxed for 2 hours with 5.0 g. of zinc dust in 250 ml. of glacial acetic acid. The reaction mixture is then filtered hot. On cooling the filtrate, 2-[3-phenyl-coumarinyl-(7)] - 4,5 - diphenyl-v-triazole is obtained in the form of pale yellow needles which melt, after one recrystallisation from toluene, at 216°. The new triazole dissolves with a strong blue-violet fluorescence in dimethyl formamide.

Valuable v-triazolyl-coumarin optical brighteners are also obtained by reduction of the triazole oxides mentioned in Examples 2–9.

In another aspect, the invention relates to a novel process for the production of valuable 7-v-triazolyl-(2)-coumarin brighteners from the novel triazole oxides according to the invention described hereinbefore.

7-v-triazolyl - (2) - coumarin compounds are valuable brightening agents for organic material. Methods for the production of triazoles and triazole derivatives are known from the literature, e.g. in Chemical Reviews, Vol. *46*, pp. 8–47 (1950). Surprisingly, it has now been found that v-triazolyl-coumarins of formula I*

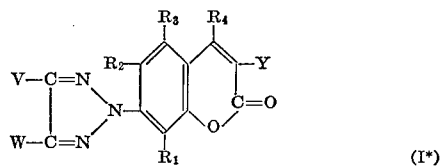

wherein

V, W, Y, $R_1$, $R_2$, $R_3$ and $R_4$ have the same meanings as in formula I, supra, can be produced by reducing v-triazole oxides of formula III or IIIa

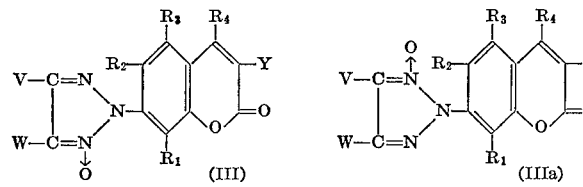

in which formulae the symbols have the same meaning as in formula I.

The v-triazole oxid-2-yl coumarins are reduced to v-triazolyl coumarins preferably by hydrogen in statu nascendi; advantageously, base metals and acid, such as zinc dust in acetic acid or mixtures of acetic acid and water are used as a source therefor. However, salts of reducing acids of phosphorus can also be used as reducing agents.

Compared with other methods for the synthesis of v-triazolyl-coumarins, e.g. from the oxime hydrazone of an α-diketone by splitting off water and cyclisation by means of acid anhydrides or protonic acids, or e.g., condensation of a 2-hydroxy-4-triazolyl benzaldehyde with an optionally ring-substituted phenylacetic acid, pure v-triazolyl-coumarin compounds are produced in high yields by the process according to the invention.

In optical brighteners and the technical use thereof, the purity of the products is of decisive importance. Even the slightest of impurities, particularly when the optical brighteners are applied in solution to the material to be brightened, can lead to a significant reduction of the white effect. Also in the brightening of polymers by the melt spinning process, in which the v-triazolyl-coumarin brighteners are added to the polymer melt before it is spun, it is necessary that the optical brighteners be of the greatest possible purity in order that the spun material have a pure white appearance. It is now possible to produce such very pure v-triazolyl-coumarins in an economical manner by the process according to the invention.

The coumarin-substituted v-triazole oxides which are the starting materials for the production according to the invention of v-triazolyl coumarins are advantageously produced by oxidising the oxime hydrazones of α-diketones of the general formulae IIa and IIb, given hereinbefore.

The production according to the invention of the v-triazolyl coumarins from the corresponding triazole oxides is naturally independent of the method by which the v-triazole oxides have been produced. Thus, coumarin-substituted v-triazole oxides obtained by other methods can also be used in the process according to this invention aspect as starting materials for the reduction stage.

In formula I*, the non-chromogenic, monovalent substituents V and W can represent the same groups as in the case of formula I, supra.

In formula I*, and correspondingly in the starting materials or intermediates of formulae IIa, IIb, III and IIIa, the substituents $R_1$ and $R_4$ are preferably hydrogen, the substituents $R_2$ and $R_3$ in preferred optical brighteners represent hydrogen, methyl or methoxy.

The mononuclear carbocyclic or heterocyclic aryl group Y in formula I* is preferably an unsubstituted or non-chromogenically substituted phenyl radical. Like V and W when representing phenyl, it can contain the non-chromogenic substituents described in the case of the v-triazole oxides of formula I, and also other substituents such as sulphamoyl or sulphonyl groups.

More specifically, in the case of sulphamoyl groups substituted at the nitrogen atom, it can represent optionally substituted N-alkyl-sulphamoyl and N,N-dialkyl-sulphamoyl groups such as N-methyl-, N-ethyl-, N-butyl-, N-hydroxyethyl-, N-methoxy-ethyl-, N-ethoxyethyl-, N-dimethylaminoethyl-, N-dimethylaminopropyl-, N-diethylaminoethyl-sulphamoyl groups and N-dimethyl- and N-diethyl-sulphamoyl groups and morpholinosulphonyl groups; it can also represent alkylsulphonyl groups such as methyl sulphonyl, ethylsulphonyl, butylsulphonyl groups; furthermore, carboxyl groups; carbalkoxy groups such as methoxy carbonyl, ethoxy carbonyl, butoxy carbonyl, benzyloxy carbonyl or cyclohexyloxy carbonyl groups; carbamoyl groups either unsubstituted or substituted at the nitrogen atom, e.g. N-ethyl-carbamoyl, N,N-diethylcarbamoyl, N-hydroxyethyl-carbamoyl, N-(3 - methoxy-propyl)-carbamoyl, morpholino-carbonyl, piperidino-carbonyl or N-(3-dimethylamino-propyl)-carbamoyl groups; also, as further specific groups not mentioned hereinbefore, substituted alkyl groups such as $$-CH_2\overset{|}{N}-COOC_2H_5 \quad -CH_2\overset{|}{N}-C_2H_5,$$
with $CH_3$ / $C_2H_5$ respectively

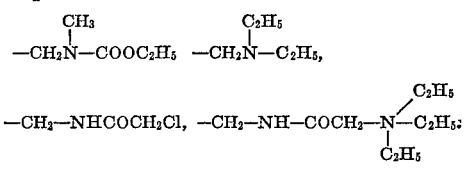

As in the case of formula I, Y in formula I* can also represent a furyl-(2) or a thienyl-(2) radical which can in turn be substituted, e.g. by lower alkyl groups such as the methyl group.

In particularly preferred compounds of formula I*, one of the two radicals V and W represents hydrogen or a low molecular alkyl group whilst the other represents a low molecular alkyl group, a phenyl group unsubstituted or substituted by methyl, halogen up to the atomic number 35 or low molecular alkoxy groups, a furyl-(2) group or a thienyl-(2) group, and $R_1$, $R_2$, $R_3$ and $R_4$ represent hydrogen and Y represents a phenyl, methylphenyl or a chlorophenyl radical.

The v-triazolyl-coumarins obtained by the process according to the invention from the corresponding triazole oxides are particularly valuable when the coumarin compounds have the following substituents:

(a) basic substituents, e.g. of aromatic rings or of functional groups, as described under the first aspect of the invention, because they lend to the new optical brighteners affinity to fibers made of acid modified polymers;

(b) acid substituents, as described under the first aspect of the invention, because they lend to the new optical brighteners affinity to natural and synthetic polyamide fibers.

The v-triazoles obtained according to the invention of formula I form colourless to yellowish crystalline substances. Ionogenically substituted products dissolved in water or polar organic solvents, and compounds not containing ionogenic groups dissolved in organic solvents, have an intensive blue to violet fluorescence. Incorporated into or drawn on to yellowed organic material by the usual methods, the new compounds give to such material a pure white appearance in daylight and are, therefore, valuable optical brighteners.

They are suitable, therefore, as optical brighteners for substrates of the most various kinds, the preferred group of substrates being determined by the substitution. Thus, v-triazolyl coumarins containing sulphonic or carboxylic acid groups have good white effects on cellulose and polyamide materials such as cotton, viscose silk, staple fibre, nylon, polyamides based on caprolactam, wool and silk, the polyamides preferably being brightened from an acid aqueous bath or in the spinning melt and the cellulose substrates being brightened from an acid to alkaline aqueous bath. Products having cationic character are particularly suitable for the brightening of polymeric and copolymeric acrylonitrile textile materials. Those v-triazolyl-coumarins containing no ionogenic groups are, however, particularly suitable. These products are suitable for the optical brightening of high molecular, hydrophobic, organic material, chiefly for the brightening of synthetic organic polyplasts, i.e. synthetic materials obtained by polymerisation, e.g. polycondensation or polyaddition such as polyolefins, e.g. polyethylene or polypropylene, also polyvinyl chloride, chiefly however, of polyester, particularly polyesters of aromatic polycarboxylic acids with polyvalent alcohols such as polyterephthalic acid glycol ethers, synthetic polyamides such as Nylon 6 and Nylon 66, also however, of cellulose esters such as cellulose acetates.

The following examples further illustrate this aspect of the invention. The temperatures are given in degrees Centigrade. Percentages are given by weight.

EXAMPLE 12

5.0 g. of 2-[3-phenyl-coumarinyl-(7)]-4-phenyl-5-methyl-v-triazole-1-oxide and 5.0 g. of zinc dust are refluxed for 2 hours in 250 ml. of glacial acetic acid. The reaction mixture is then filtered hot. On cooling, 2-[3-phenyl-coumarinyl-(7)]-4-phenyl-5 - methyl-v-triazole is recovered from the filtrate.

EXAMPLE 13

8.0 g. of 2-[3-phenyl-coumarinyl-(7)]-4-methyl-5-furyl-(2)-v-triazole-3-oxide and 10.0 g. of zinc dust in 200 ml. of glacial acetic acid are refluxed for 2 hours. The reaction mixture is filtered hot and the filtrate cooled. The 2-[3-phenylcoumarinyl-(7)]-4-methyl-5-furyl-(2)-v-triazole formed crystallises out. After recrystallisation from a mixture of toluene and ligroin, the v-triazole derivative melts at 196°.

EXAMPLE 14

15.9 g. of 2-[3-phenyl-coumarinyl-(7)]-4-methyl-v-triazole-3-oxide and 10.0 g. of zinc dust are refluxed for 2 hours in 250 ml. of glacial acetic acid. The reaction mixture is filtered hot and, on cooling the filtrate, yellow crystals precipitate. After recrystallisation from toluene and from ligroin, the 2-[3-phenyl-coumarinyl-(7)]-4-methyl-v-triazole obtained melts at 216°.

EXAMPLE 15

The triazole oxide obtained from 7.8 g. of 4-phenyl-3-isonitrosobutan - 2 - one-[3-phenyl-coumarinyl-(7)]-hydrazone is suspended, in a moist state, in 150 ml. of glacial acetic acid. 3 ml. of 30% hydrochloric acid and then 10 g. of zinc dust are added, after which the mixture is stirred and heated to 60–70°. Even after 10 minutes, the reaction mixture is only pale yellow coloured. The reaction mixture is filtered hot and cooled. The 2-[3-phenyl-coumarinyl-(7)]-4-methyl - 5 - benzyl-v-triazole formed separates out in the form of pale yellowish coloured crystals. The precipitated crystals are filtered off and further purified by recrystallisation from a mixture of benzene and ligroin. The purified product forms almost colourless crystals which melt at 172°.

EXAMPLE 16

(a) 163.2 g. of sodium acetate and 288.6 g. of 3-phenyl - 7-hydrazino-coumarin chlorohydrate are mixed in 1000 ml. of pyridine with stirring and heated to 60°. 101 g. of diacetyl monoxime dissolved in 200 ml. of pyridine are added at this temperature to the mixture and the latter is then heated at 90 to 100° and stirred for 2 hours at that temperature.

(The resulting diacetyl-[3-phenyl-coumarinyl-(7)]-hydrazone oxime can be isolated; however, it is simpler to continue with the unseparated reaction mixture.)

To the latter mixture, a solution of 25.0 g. of copper sulfate pentahydrate is added dropwise and the whole is then stirred vigorously for 7 to 8 hours while air is introduced thereinto. The resulting crystalline precipitate is separated from the reaction mixture after cooling, by suction filtration; the filter residue is then washed with methanol and dried. About 300 to 320 g. of 2-[3-phenyl-coumarinyl-(7)]-4,5-dimethyl-v-triazole oxide is obtained which has a melting point of 229 to 230°. The yield rate is 90 to 96% calculated on 3-phenyl-7-hydrazino-coumarin.

(b) 166.7 g. of 2-[3 - phenyl-coumarinyl-(7)]-4,5-dimethyl-v-triazole oxide and 65.0 g. of zinc dust are refluxed in 1000 ml. of chlorobenzene. A mixture of 50 ml. of glacial acetic acid and 50 ml. of concentrated hydrochloric acid is added dropwise to the stirred, boiling chlorobenzene solution within 8 hours. On completion of the reduction, the reaction mixture is filtered hot through a warmed filter and 1 litre of methanol is added to the filtrate which is then cooled. 2-[3-phenyl-coumarinyl-(7)]-4,5-dimethyl-v-triazole precipitates in the form of pale yellow needles. The product is recrystallised from chlorobenzene and is thereby obtained in highly pure state; yield rate: 74–78% calculated on the triazole oxide, and about 70–74%, calculated on the starting phenylhydrazino-coumarin.

EXAMPLE 17

20.4 g. of 2-[3-phenyl-coumarinyl-(7)]-4,5-dihydronaphtho[1,2-d]-v-triazole oxide in 100 ml. of glacial acetic acid are refluxed for 8 hours with 20.0 g. of zinc dust. The reaction mixture is then filtered hot. On cooling, yellow crystals precipitate from the filtrate. After one recrystallisation from chlorobenzene, 2-[3-phenyl-coumarinyl-(7)]-4,5-dihydronaphtho[1,2-d]-v-triazole is obtained, M.P. 216°.

We claim:

1. A process for the production of coumarinyl-v-triazoles, comprising (a) adding to 3-phenyl-7-hydrazino-coumarin of the formula

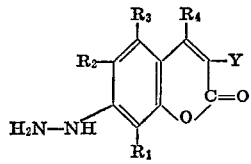

or an addition salt thereof with an acid, an oxime of one of the formulas

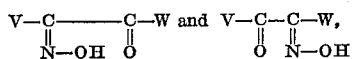

thereby reacting the two starting compounds with formation of the corresponding hydrazone oxime, (b) adding thereto an oxidising agent under oxidising conditions in a solvent stable to oxidation, (c) adding to the resulting v-triazole oxide of the corresponding one of the formulae

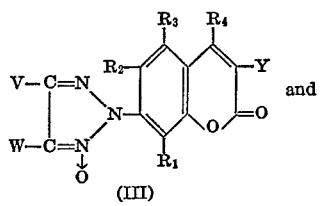

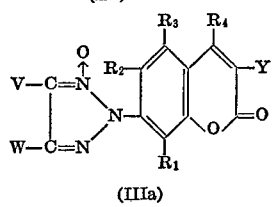

a reducing agent under reductive conditions, and (d) recovering the resulting compound of the formula

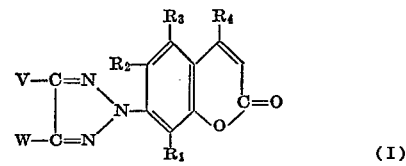

from the reaction mixture;

like symbols in the above formulae having the same meanings as follows:

Y represents a phenyl radical any substituent of which is selected from lower alkoxy, lower alkyl, and halogen of an atomic number of at most 35, each of V and W represents, independently of the other, hydrogen, lower alkyl, lower alkylsulphonyl, furyl, a phenyl radical any substituent of which is selected from halogen of an atomic number of at most 35, lower alkyl, lower alkoxy, nitro, carboxyl, N,N-di-(lower alkyl)-sulphamoyl and trifluoromethyl; or a phenyl-lower alkyl radical or a phenyl-sulphonyl radical, any substituents of the latter two radicals being at the benzene nuclei thereof and being selected from lower alkyl, lower alkoxy and halogen of an atomic number of at most 35;

each of $R_1$ and $R_4$ represents hydrogen or lower alkyl, and each of $R_2$ and $R_3$ represents hydrogen, lower alkyl, or lower alkoxy;

or V and W taken together represent 4,5-dihydronaphthylene-(1,2).

2. A process as described in claim 1, wherein said oxidising agent is copper-(II) sulphate and said solvent is a mixture of pyridine and water; and wherein said reducing agent is hydrogen in statu nascendi.

References Cited

Benson et al., Chem. Reviews, Vol. 46, pp. 36, 41, 47–54 (1950).

ALTON D. ROLLINS, Primary Examiner

U.S. Cl. X.R.

260—308 B